(12) United States Patent
Zhang

(10) Patent No.: US 12,123,216 B2
(45) Date of Patent: Oct. 22, 2024

(54) ROBOTIC POOL CLEANER

(71) Applicant: XINGMAI INNOVATION TECHNOLOGY(SUZHOU) CO., LTD., Jiangsu (CN)

(72) Inventor: Shilei Zhang, Jiangsu (CN)

(73) Assignee: XINGMAI INNOVATION TECHNOLOGY(SUZHOU) CO., LTD., Jiangsu (CN)

(*) Notice: Subject to any disclaimer, the term of this patent is extended or adjusted under 35 U.S.C. 154(b) by 0 days.

(21) Appl. No.: 18/234,396

(22) Filed: Aug. 16, 2023

(65) Prior Publication Data

US 2024/0263475 A1    Aug. 8, 2024

Related U.S. Application Data

(63) Continuation of application No. PCT/CN2023/086050, filed on Apr. 3, 2023.

(30) Foreign Application Priority Data

Feb. 7, 2023    (CN) .................. 202310076087.X

(51) Int. Cl.
E04H 4/16    (2006.01)

(52) U.S. Cl.
CPC .................. *E04H 4/1654* (2013.01)

(58) Field of Classification Search
CPC ........ E04H 4/16; E04H 4/1636; E04H 4/1654
See application file for complete search history.

(56) References Cited

U.S. PATENT DOCUMENTS

| 11,753,840 B1* | 9/2023 | Zhong | .................. E04H 4/1636 15/1.7 |
|---|---|---|---|
| 2021/0131805 A1 | 5/2021 | Biber | |
| 2022/0203560 A1* | 6/2022 | Barel | ................... E04H 4/1654 |
| 2022/0206181 A1* | 6/2022 | Santamarina | .......... G01V 1/162 |
| 2023/0175279 A1* | 6/2023 | Deng | .................. G05D 1/0219 700/245 |

FOREIGN PATENT DOCUMENTS

| CN | 205796721 U | 12/2016 |
|---|---|---|
| CN | 208153389 U | 11/2018 |
| CN | 111137410 A | 5/2020 |
| CN | 217137908 U | 8/2022 |
| CN | 217936913 U | 12/2022 |
| DE | 102017213577 A1 | 2/2019 |
| EP | 3662229 A1 | 6/2020 |
| WO | 2019025241 A1 | 2/2019 |

OTHER PUBLICATIONS

International Search Report of PCT/CN2023/086050 dated May 12, 2023.

* cited by examiner

*Primary Examiner* — Michael D Jennings
(74) *Attorney, Agent, or Firm* — Samson G. Yu

(57) ABSTRACT

Some embodiments of the present invention provide a robotic pool cleaner. The robotic pool cleaner includes a shell and a water pressure sensing mechanism. The water pressure sensing mechanism is disposed in a non-negative pressure area of the shell. The water pressure sensing mechanism includes a sensor. The sensor is disposed inside the shell. The sensor is configured to sense a water pressure at a position where the sensor is disposed.

16 Claims, 3 Drawing Sheets

ROBOTIC POOL CLEANER

CROSS-REFERENCE TO RELATED DISCLOSURE

The present disclosure is a national stage disclosure of International Patent Disclosure No. PCT/CN2023/086050, which is filed on Apr. 3, 2023, and claims priority to Chinese Patent Disclosure No. 202310076087.X. filed on Feb. 7, 2023, and entitled "robotic pool cleaner", the contents of which are hereby incorporated by reference in its entirety.

TECHNICAL FIELD

The disclosure relates to the technical field of robotic pool cleaners, and specifically relates to a robotic pool cleaner.

BACKGROUND

A robotic pool cleaner can automatically clean a bottom surface, side walls and a water surface of a pool, providing convenience for users. Especially in terms of a swimming pool which needs to be cleaned frequently, the robotic pool cleaner is widely favored by users. At present, when the common robotic pool cleaner cleans the internal surface of the pool, the robotic pool cleaner itself does not know the depth information of its current location, so that the robotic pool cleaner does not know whether it has been above the water surface, whether it has sunk to the bottom and its depth on the wall where it is travelling, finally leading to the failure of realizing some intelligent functions.

In order to solve the above problems, it is urgent to provide a robotic pool cleaner to solve the problem that the robotic pool cleaner cannot identify its own depth.

SUMMARY

Some embodiments of the present disclosure provide a robotic pool cleaner to identify its own position in water with high accuracy.

In order to solve the above problem, the disclosure provides a robotic pool cleaner. The robotic pool cleaner includes: a shell; and a water pressure sensing mechanism, disposed in a non-negative pressure area of the shell, the water pressure sensing mechanism including a sensor, the sensor being disposed in the non-negative pressure area, and the sensor being configured to sense a water pressure at a position where the sensor is disposed.

In some embodiments, the water pressure sensing mechanism includes: a body; and a partition, the partition and the body forming an accommodating cavity, and the sensor being disposed in the accommodating cavity.

In some embodiments, the body includes a first groove which is recessed. the partition covers an opening of the first groove to form the accommodating cavity with the first groove. The partition includes a first water through hole which is in communication with the accommodating cavity.

In some embodiments, the partition is detachably fitted with the body.

In some embodiments, the partition includes at least two second grooves which are configured to grip the partition.

In some embodiments, the partition includes an L-shaped or U-shaped cross section, the partition is hermetically connected with an inner wall of the body so as to form the accommodating cavity between the partition and the body, and the body includes a first water through hole.

In some embodiments, there is a plurality of the first water through holes, and the plurality of first water through holes is arranged in an array.

In some embodiments, the first water through hole is an elongated hole, and the plurality of elongated holes is arranged in parallel and at intervals.

In some embodiments, the water pressure sensing mechanism further includes: a casing, covering the sensor, the casing including a second water through hole.

In some embodiments, the robotic pool cleaner includes: a cleaning channel, penetrating from a bottom to a top of the shell, where when the robotic pool cleaner works, garbage and sewage are drawn in through an inlet of the cleaning channel and discharged through an outlet of the cleaning channel, and the non-negative pressure area is an area outside the cleaning channel in the shell.

In some embodiments, wherein the casing is a filter screen or a filter casing.

In some embodiments, wherein the robotic pool cleaner includes: a control mechanism and a driving mechanism, the driving mechanism is electrically connected with the control mechanism, and the control mechanism controls the driving mechanism to start and stop; when the water pressure sensing mechanism sends a information which the robotic pool cleaner reaches to the bottom to the control mechanism, the control mechanism controls the driving mechanism to start; when the water pressure sensing mechanism sends a information which the robotic pool cleaner leaves the water surface to the control mechanism, the control mechanism controls the driving mechanism to stop.

In some embodiments, wherein the robotic pool cleaner includes: a map planning module, being configured to draw a pool bottom map and plan a movement path of the robotic pool cleaner during a cleaning process.

In some embodiments, wherein the water pressure sensing mechanism sends current depth information of the robotic pool cleaner to the control mechanism, and the map planning module establishes a three-dimensional pool map according to the depth information.

BRIEF DESCRIPTION OF THE DRAWINGS

To describe the technical solutions in the embodiments of the present disclosure more clearly, the following briefly introduces the accompanying drawings required for describing the embodiments of the present disclosure. Apparently, the accompanying drawings in the following description show only some embodiments of the present disclosure, and a person of ordinary skill in the art can still derive other drawings from the contents in the embodiments of the present disclosure and these accompanying drawings without creative efforts.

REFERENCE SIGNS IN THE FIGURES 100. shell; 110. body; 120. partition; 121. first water through hole; 122. second groove; 130. accommodating cavity;
200. water pressure sensing mechanism; 210. sensor;
300. cleaning channel;

400. control mechanism;
500. driving mechanism.

DETAILED DESCRIPTION OF THE EMBODIMENTS

The present disclosure will be further described in detail below with reference to the accompanying drawings and embodiments. It can be understood that the specific embodiments described herein are only used to explain the present disclosure, but not to limit the present disclosure. In addition, it should also be noted that for the convenience of description, only a part of the structures related to the present disclosure rather than all the structures are shown in the accompanying drawings.

In the description of the present invention, unless otherwise expressly specified and defined, the terms "connected to", "connected with" and "fixed" should be construed in a broad sense. For example, two elements can be fixedly connected, detachably connected or integrally connected; or can be mechanically connected or electrically connected; or can be directly connected or indirectly connected through an intermediate medium; or can be in internal communication or interact with each other. For those of ordinary skill in the art, the specific meaning of the above terms in the present invention can be understood according to specific situations.

Figure 1:
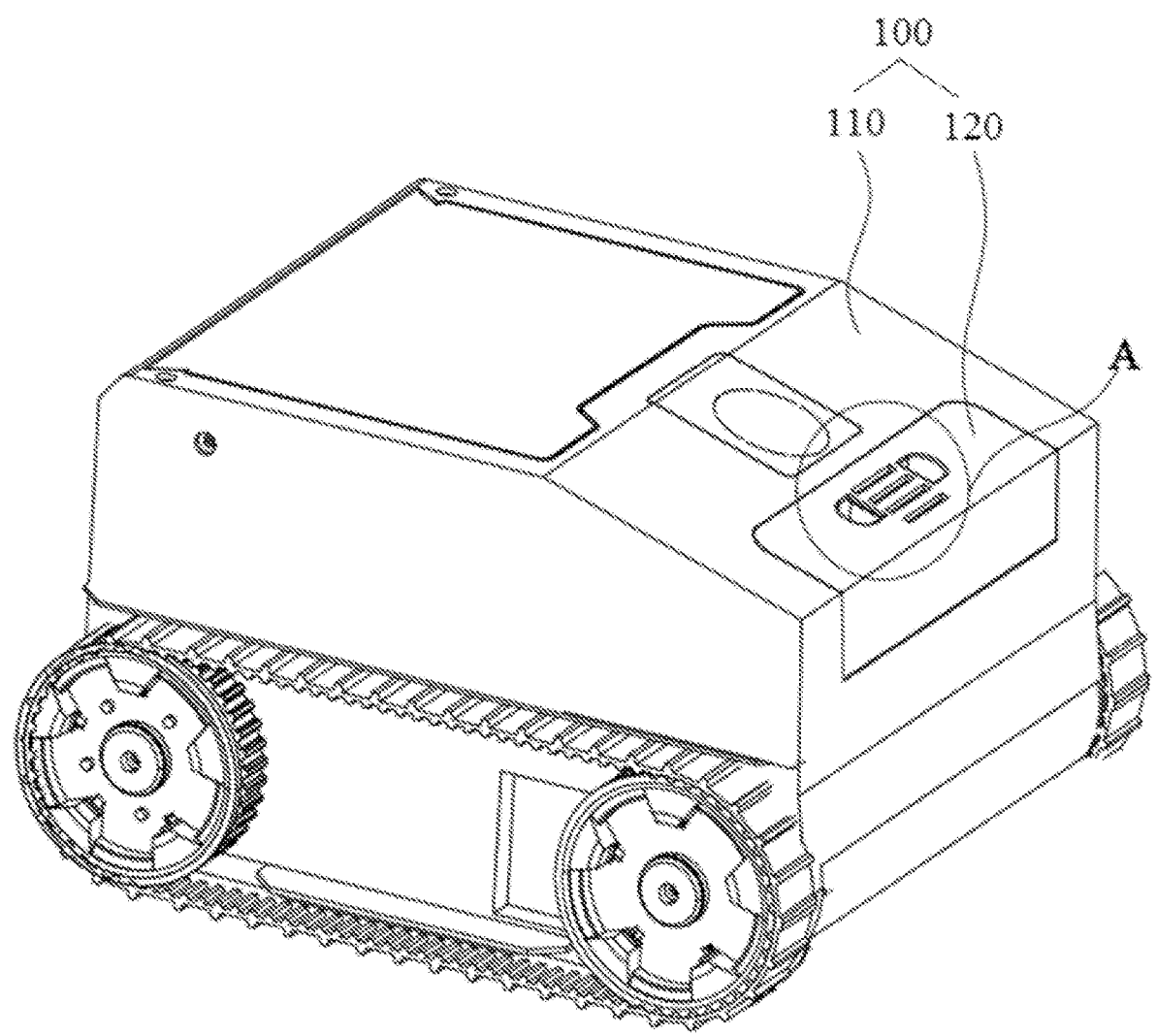
FIG. 1 illustrates a schematic structural view of a robotic pool cleaner according to an embodiment of the present disclosure.
Figure 2:
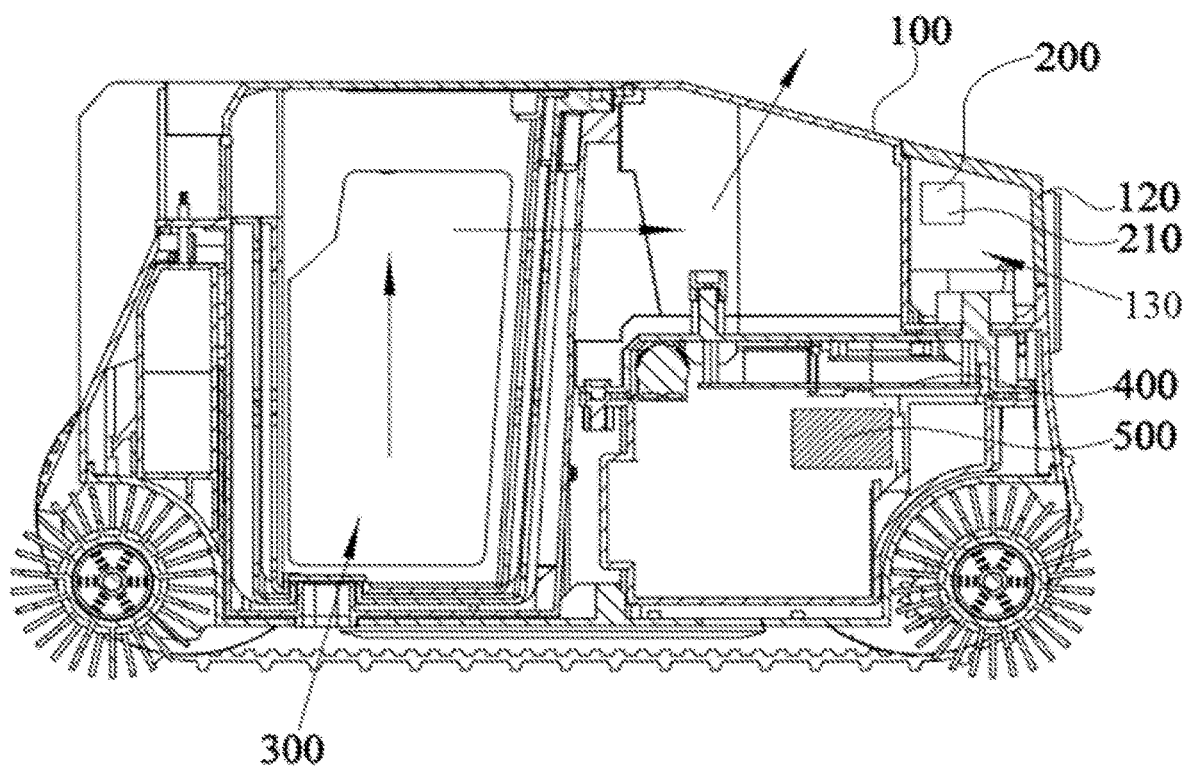
FIG. 2 illustrates a schematic sectional structural view of a robotic pool cleaner according to an embodiment of the present disclosure.

As shown in FIG. 1 and FIG. 2, this embodiment provides a robotic pool cleaner. The robotic pool cleaner is used for cleaning a pool. The robotic pool cleaner includes a control mechanism 400 and a driving mechanism 500. The driving mechanism 500 is electrically connected with the control mechanism 400. The control mechanism 400 can control the driving mechanism 500 to start and stop. In this disclosure, when the robotic pool cleaner reaches to the bottom, the driving mechanism 500 starts. When the robotic pool cleaner leaves the water surface, the driving mechanism 500 stops, thereby maximally saving the electric energy.

However, in the art known to inventors, when the robotic pool cleaner cleans the internal surface of the pool, the robotic pool cleaner itself does not know the depth information of its current location, so that the robotic pool cleaner does not know whether it has been above the water surface, whether it has sunk to the bottom and its depth on the wall where it is travelling, finally leading to the failure of realizing some intelligent functions.

As shown in FIG. 2, in order to solve the above problems, the robotic pool cleaner further includes a shell 100 and a water pressure sensing mechanism 200. The water pressure sensing mechanism 200 is disposed in a non-negative pressure area of the shell 100. The water pressure sensing mechanism 200 includes a sensor 210. The sensor 210 is disposed in the non-negative pressure area. The sensor 210 can sense a water pressure at a position where the sensor 210 is disposed, so that the robotic pool cleaner can make corresponding intelligent operations according to its position in water. It can be understood that there exist static and dynamic pressures underwater. The depth of the robotic pool cleaner is usually calculated based on the static pressure, and the dynamic pressure underwater can affect the accuracy of depth detection. Therefore, the water pressure sensing mechanism 200 is disposed in the non-negative pressure area where the sensor 210 can only sense the static pressure, which reduces the effect of the dynamic pressure underwater on the accuracy of depth calculation and helps the sensor 210 accurately identify its depth in water, thereby assisting the robotic pool cleaner to accurately determine its position in water and improving the identification accuracy.

Figure 3:
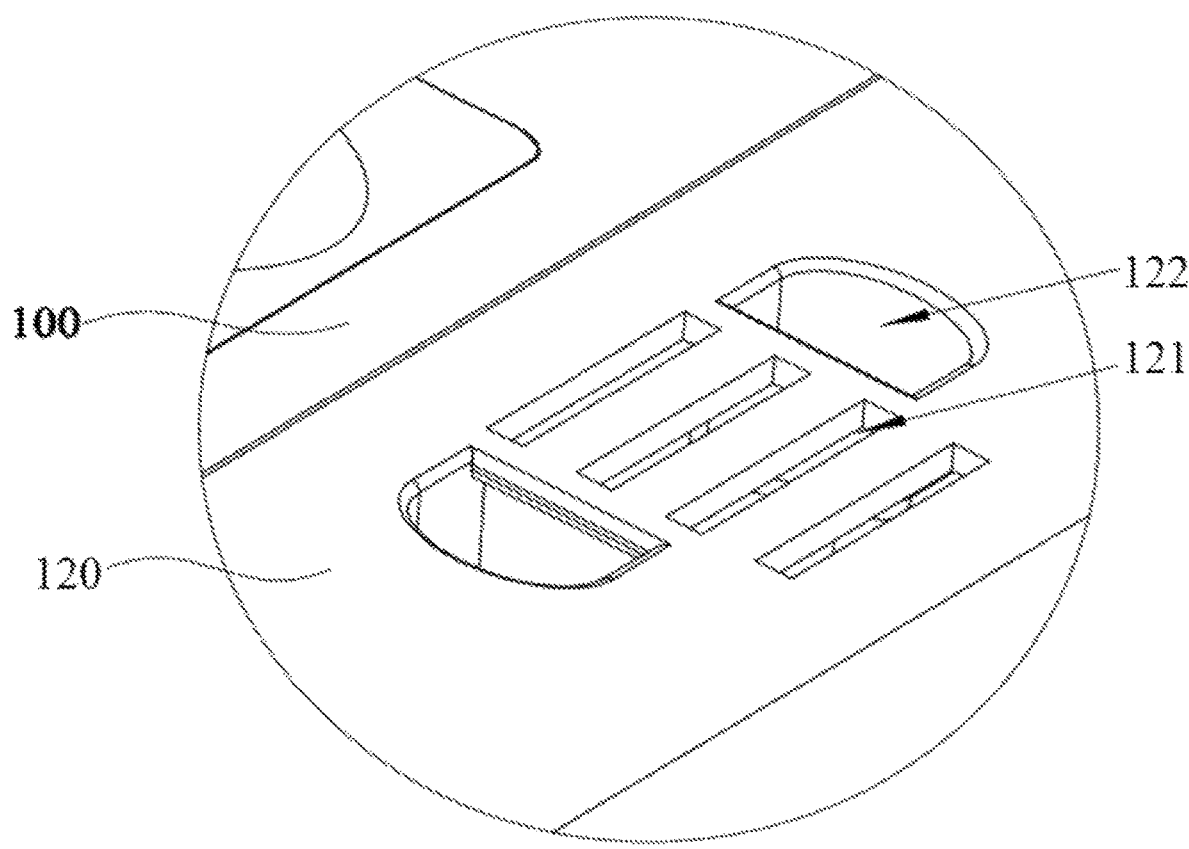
FIG. 3 illustrates a partial enlarged view of A in FIG. 1.

As shown in FIG. 2 and FIG. 3, it can be understood that the robotic pool cleaner is used for cleaning garbage underwater, so the robotic pool cleaner further includes a cleaning channel 300. The cleaning channel 300 runs through the shell 100 from a bottom to a top. When the robotic pool cleaner works, garbage and sewage are drawn in through an inlet of the cleaning channel 300 and discharged through an outlet of the cleaning channel 300.

In some embodiments, when the robotic pool cleaner works, there is a continuous flow of water in the cleaning channel 300, so the water pressure sensing mechanism 200 is not suitable to be arranged in the cleaning channel. Therefore, the non-negative pressure area is an area outside the cleaning channel 300 in the shell 100, thereby ensuring that the sensor 210 disposed in the non-negative pressure area to detect the pressure in a static pressure environment.

In some embodiments, when the water pressure sensing mechanism 200 is used in combination with a driving structure, by the aid of the water pressure sensing mechanism 200, the robotic pool cleaner can correctly determine whether it has reached the bottom of the pool. Specifically, after the water pressure sensing mechanism 200 sends information that the robotic pool cleaner has reached the bottom of pool to the control mechanism 400, and the control mechanism 400 can control the driving mechanism 500 to start. After the robotic pool cleaner finishes working, the water pressure sensing mechanism 200 sends information that the robotic pool cleaner has left the water surface of pool to the control mechanism 400, and then, the control mechanism 400 can control the driving mechanism 500 to stop, thereby saving the electric energy.

In some embodiments, the robotic pool cleaner further includes a map planning module. The map planning module is used for drawing a pool bottom map and planning a movement path of the robotic pool cleaner during a cleaning process. When the map planning module is used in combination with the water pressure sensing mechanism 200, the water pressure sensing mechanism 200 sends current depth information of the robotic pool cleaner to the control mechanism 400, and the map planning module can establish a three-dimensional pool map.

As shown in FIG. 2 and FIG. 3, as an optional solution, the shell 100 includes a body 110 and a partition 120. The partition 120 and the body 110 form an accommodating cavity 130, and the sensor 210 is disposed in the accommodating cavity 130. Thereby, a static pressure environment is provided for the sensor 210, which helps in ensuring the accuracy of the detection result of the sensor 210.

In some embodiments, the body 110 is provided with a recessed first groove. The partition 120 covers an opening of the first groove to form the accommodating cavity 130 with the first groove. The partition 120 is provided with a first water through hole 121. When the robotic pool cleaner dives into water, the water in the pool can enter the accommodating cavity 130 through the first water through hole 121 and fully fill the accommodating cavity 130. After the accommodating cavity 130 is fully filled, there is no flow of water in the accommodating cavity 130, so there is no dynamic pressure, but only static pressure, thereby providing a stable static pressure environment for the sensor 210.

In some embodiments, the partition 120 is detachably fitted with the body 110, so that the partition 120 can be quickly mounted to and demounted from the body 110. When the robotic pool cleaner works, if there are a large amount of impurities in the accommodating cavity 130, the detection result of the sensor 210 can be easily affected. Therefore, after the robotic pool cleaner has been used for a period of time, the user can demount the partition 120 and clean the accommodating cavity 130.

In some embodiments, in order to facilitate mounting and demounting of the partition 120, the partition 120 is provided with at least two second grooves 122 for gripping the partition 120.

In some embodiments, the partition 120 has an L-shaped or U-shaped cross section. The partition 120 is hermetically connected with an inner wall of the body 110 so as to form the accommodating cavity 130 between the partition 120 and the body 110, and the body 110 is provided with a first water through hole 121. That is, the accommodating cavity 130 is formed by arranging the partition 120 inside the body 110. The sensor 210 is disposed in the accommodating cavity 130.

As shown in FIG. 3, optionally, the first water through hole 121 is an elongated hole. The plurality of elongated holes are disposed in parallel and at intervals, so that water can flow inside and outside the partition 120, and the stability of flow of water can be ensured. Moreover, the elongated holes can function as a filter that can prevent the garbage from entering the accommodating cavity 130, thereby ensuring the detection accuracy of the sensor 210.

In some embodiments, there are a plurality of the first water through holes 121, and the plurality of first water through holes 121 are disposed in an array, so that water can flow inside and outside the first water through holes 121. The first water through holes 121 can also function as a filter.

In some embodiments, the water pressure sensing mechanism 200 further includes a casing, covering the sensor 210. The casing is provided with a second water through hole. The casing is utilized to further filter out impurities, so that an impurity-free environment is formed in the accommodating cavity 130 for the sensor 210, thereby ensuring the accuracy of the detection result of the sensor 210.

In some embodiments, the casing can be a structure that can function as a filter, for example, a filter screen or a filter casing. The filter screen or the filter casing is simple in structure, easy to realize and beneficial to reducing the cost.

It should be noted that the basic principle, main features and advantages of the present disclosure have been shown and described above. It should be understood by those skilled in the art that the present disclosure is not limited by the above implementations, and the description in the above implementations and specification only illustrates the principle of the present disclosure. Without departing from the spirit and scope of the present disclosure, there will be various changes and improvements, which shall fall within the protection scope of the present disclosure. The protection scope of the present disclosure is defined by the appended claims and equivalents thereof.

What is claimed is:

1. A robotic pool cleaner, wherein the robotic pool cleaner comprises:
 a shell;
 a water pressure sensing mechanism, disposed in a non-negative pressure area of the shell, the water pressure sensing mechanism comprising a sensor, the sensor being disposed in the non-negative pressure area, and the sensor being configured to sense a water pressure at a position where the sensor is disposed; and
 a cleaning channel, wherein when the robotic pool cleaner works, garbage and sewage are drawn in through an inlet of the cleaning channel and discharged through an outlet of the cleaning channel, and the non-negative pressure area is an area outside the cleaning channel in the shell.

2. The robotic pool cleaner as claimed in claim 1, wherein the shell comprises:
 a body; and
 a partition, the partition and the body forming an accommodating cavity, and the sensor being disposed in the accommodating cavity.

3. The robotic pool cleaner as claimed in claim 2, wherein the body comprises a first groove which is recessed, the partition covers an opening of the first groove to form the accommodating cavity with the first groove, and the partition comprises a first water through hole which is in communication with the accommodating cavity.

4. The robotic pool cleaner as claimed in claim 3, wherein the partition is detachably fitted with the body.

5. The robotic pool cleaner as claimed in claim 4, wherein there is a plurality of the first water through holes, and the plurality of first water through holes is arranged in an array.

6. The robotic pool cleaner as claimed in claim 4, wherein the first water through hole is an elongated hole, and the plurality of elongated holes is arranged in parallel and at intervals.

7. The robotic pool cleaner as claimed in claim 3, wherein the partition comprises at least two second grooves which are configured to grip the partition.

8. The robotic pool cleaner as claimed in claim 7, wherein there is a plurality of the first water through holes, and the plurality of first water through holes is arranged in an array.

9. The robotic pool cleaner as claimed in claim 7, wherein the first water through hole is an elongated hole, and the plurality of elongated holes is arranged in parallel and at intervals.

10. The robotic pool cleaner as claimed in claim 3, wherein there is a plurality of the first water through holes, and the plurality of first water through holes is arranged in an array.

11. The robotic pool cleaner as claimed in claim 3, wherein the first water through hole is an elongated hole, and the plurality of elongated holes is arranged in parallel and at intervals.

12. The robotic pool cleaner as claimed in claim 2, wherein the partition comprises an L-shaped or U-shaped cross section, the partition is hermetically connected with an inner wall of the body so as to form the accommodating cavity between the partition and the body, and the body comprises a first water through hole.

13. The robotic pool cleaner as claimed in claim 12, wherein there is a plurality of the first water through holes, and the plurality of first water through holes is arranged in an array.

14. The robotic pool cleaner as claimed in claim 12, wherein the first water through hole is an elongated hole, and the plurality of elongated holes is arranged in parallel and at intervals.

15. The robotic pool cleaner as claimed in claim 1, wherein the water pressure sensing mechanism further comprises:
 a casing, covering the sensor, the casing comprises a second water through hole.

16. The robotic pool cleaner as claimed in claim 15, wherein the casing is a filter screen or a filter casing.

* * * * *